Nov. 14, 1961     I. HERPIN     3,008,356
SAW TOOTH CUTTING MACHINE
Filed Oct. 19, 1959     3 Sheets-Sheet 1

INVENTOR
Ivey Herpin

BY

ATTORNEY

Nov. 14, 1961 I. HERPIN 3,008,356
SAW TOOTH CUTTING MACHINE
Filed Oct. 19, 1959 3 Sheets-Sheet 2

INVENTOR
Ivey Herpin
BY
ATTORNEY

Nov. 14, 1961     I. HERPIN     3,008,356
SAW TOOTH CUTTING MACHINE

Filed Oct. 19, 1959     3 Sheets-Sheet 3

INVENTOR
Ivey Herpin

BY

ATTORNEY

United States Patent Office 3,008,356
Patented Nov. 14, 1961

3,008,356
SAW TOOTH CUTTING MACHINE
Ivey Herpin, 110 N. Ira Ave., Dallas 11, Tex.
Filed Oct. 19, 1959, Ser. No. 847,362
5 Claims. (Cl. 76—29)

This invention relates to a machine for cutting saw teeth and it has particular reference to an automatic mechanism adapted for cutting teeth in gin saw blades whose teeth are required to be relatively long and extremely sharp, and directed tangentially.

A primary object of the invention resides in the provision of a machine which is compact and simple, and embodies features by which the teeth are formed by cutting V-shaped slugs about the periphery of a blank disk and employing a rotary member having cutting elements thereon operating in the manner of a hammer in cooperation with a pair of dies adjustably arranged at angles to each other and to the plane of operation of the cutting elements.

A further object of the invention is that of providing a mechanism by which the blank disk is securely retained in operative relation to the cutting element and automatically advanced in rotation in synchrony with the rotation of the cutting member so that the teeth are uniformly shaped and spaced.

A still further object of the invention resides in the provision of means whereby, when the cutting operations are completed, the saw blade can be withdrawn from the rotary cutting member and removed from the machine and, at the same time, stopping the cutting member.

Yet another object of the invention is manifest in the provision of means cooperating with the rotary cutting member for lubricating the cutting elements and removing therefrom the cut out portions of the blade, and other metal particles, which might tend to impair the proper function of the device.

Broadly, the invention contemplates the provision of a saw tooth cutting machine in which all of the operating parts are synchronized to perform the cutting operations with speed, accuracy and uniformity.

While the foregoing objects are paramount, other and lesser objects will become manifest as the description proceeds, taken in connection with the appended drawings wherein.

Figure 1:
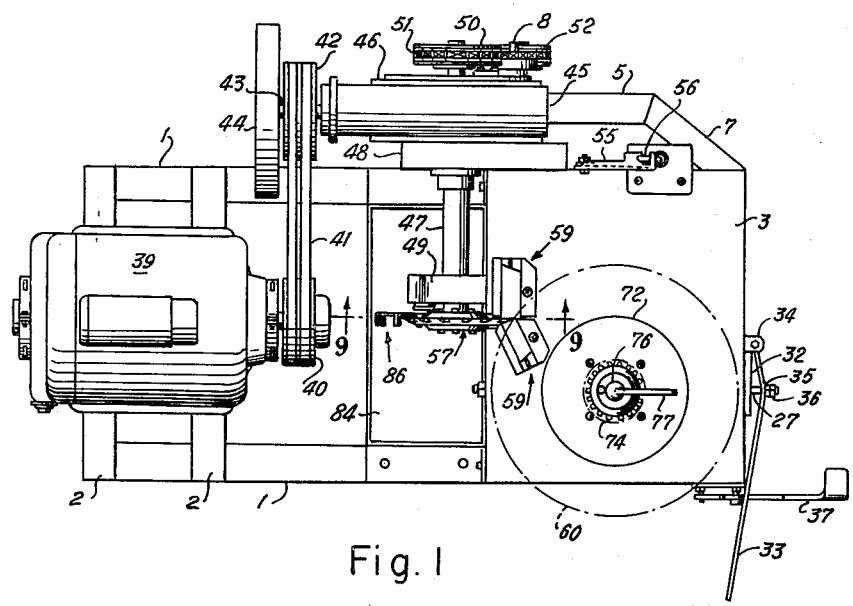
FIGURE 1 is a top plan view of a saw tooth cutting machine embodying the invention.
Figure 2:
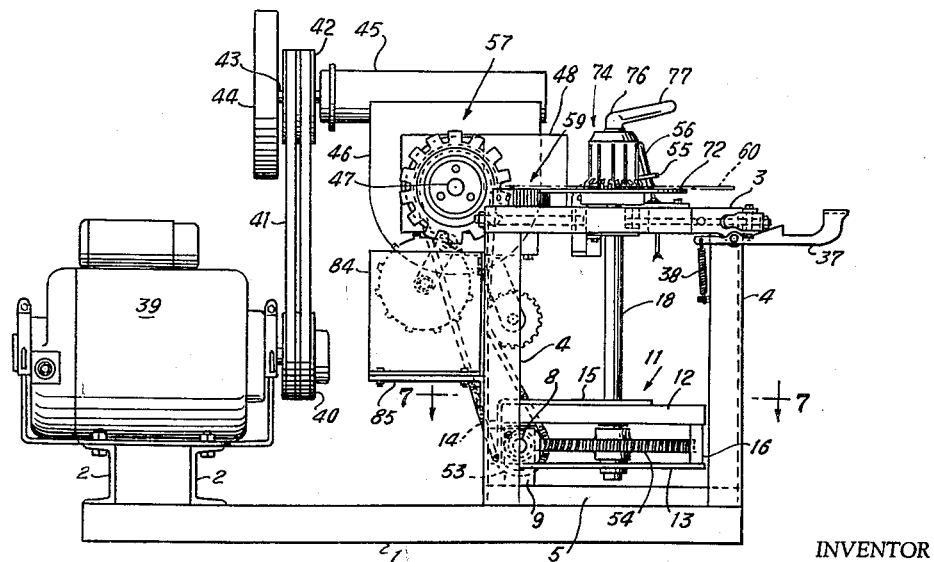
FIGURE 2 is a front elevational view.
Figure 3:
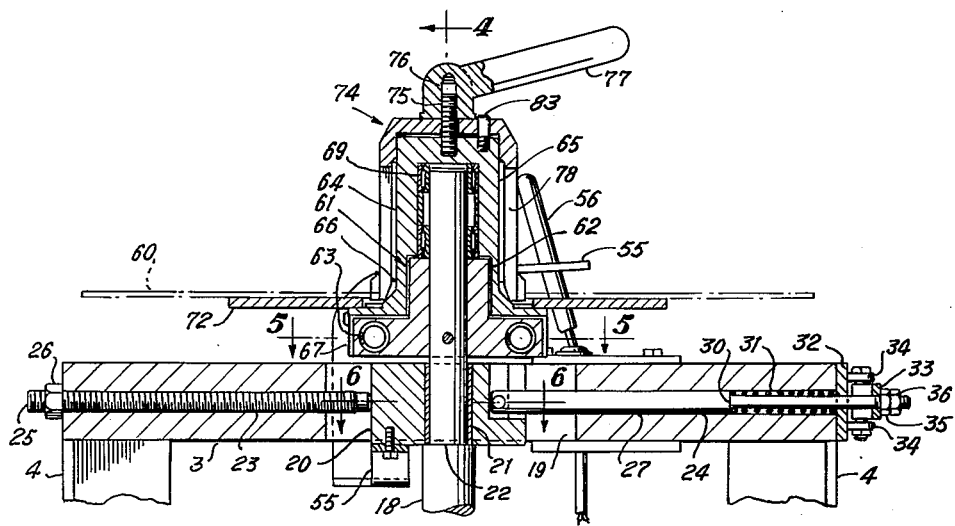
FIGURE 3 is a fragmentary sectional elevational view, on an enlarged scale.
Figure 11:
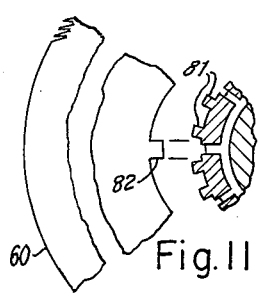
FIGURE 11 is a fragmentary, diagrammatic plan view, on an enlarged scale.
Figure 4:
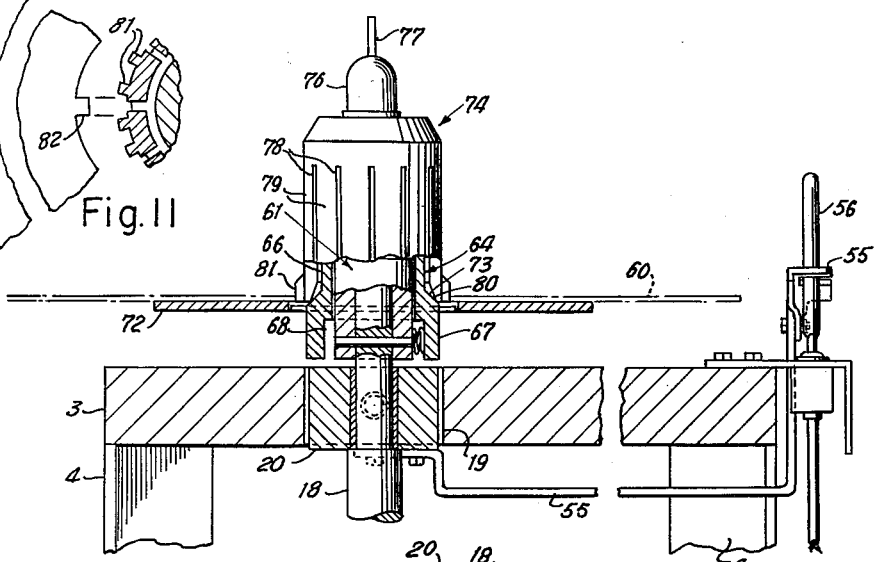
FIGURE 4 is a sectional elevational view taken on the line 4—4 of FIGURE 3.
Figures 5, 6:
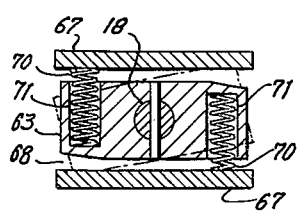
FIGURE 5 is a sectional plan view taken on the line 5—5 of FIGURE 3.
FIGURE 6 is a sectional plan view taken on the line 6—6 of FIGURE 3.
Figure 7:
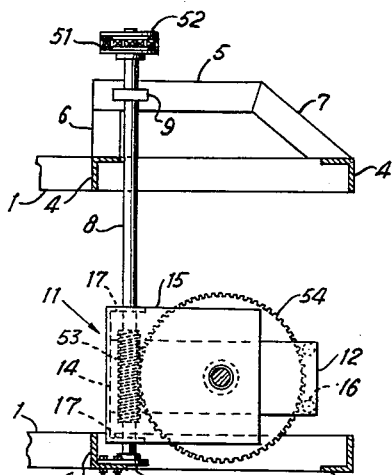
FIGURE 7 is a sectional plan view taken on the line 7—7 of FIGURE 2.
Figure 8:
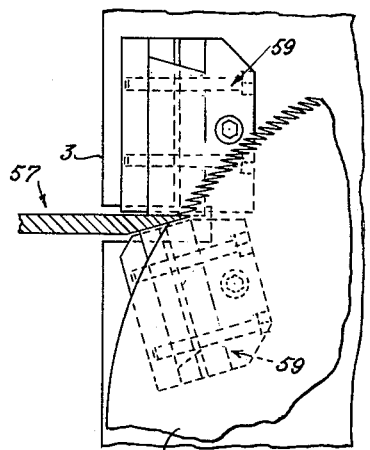
FIGURE 8 is a fragmentary sectional plan view.
Figure 9:
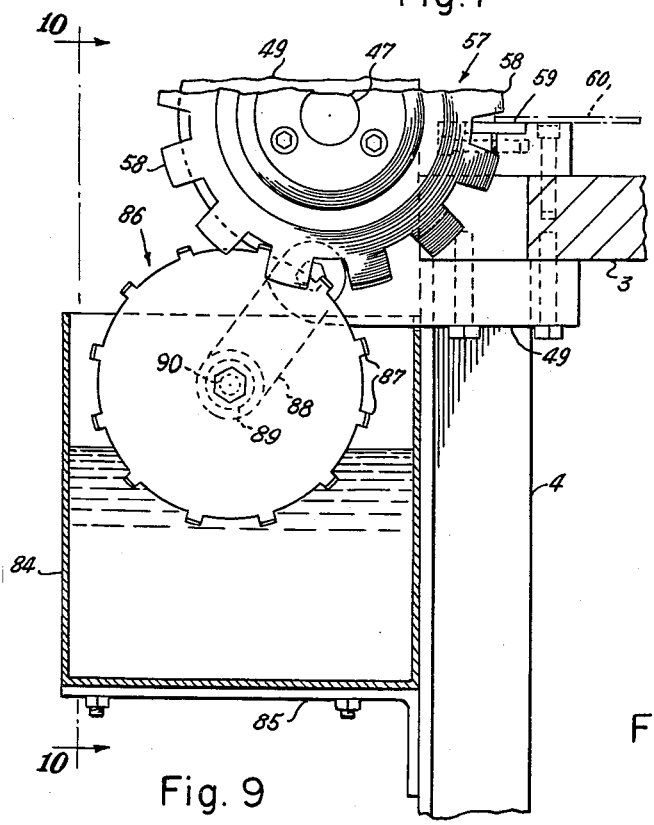
FIGURE 9 is a fragmentary sectional elevational view, on an enlarged scale, taken on the line 9—9 of FIGURE 1.
Figure 10:
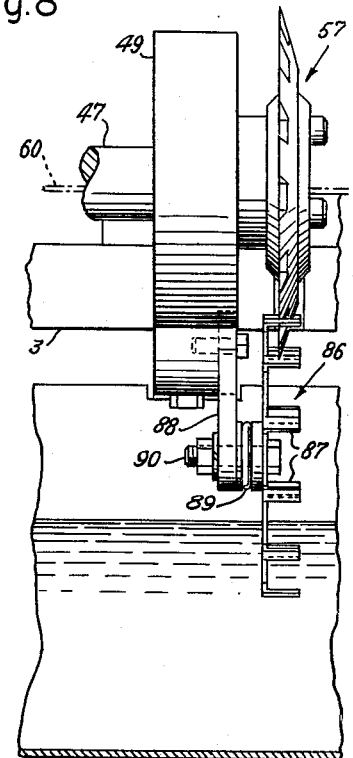
FIGURE 10 is a sectional elevational view taken on the line 10—10 of FIGURE 9.

Referring to the drawing, the saw tooth cutting machine of the invention has a frame including a pair of elongated base members 1, which are right angular in transverse section and are arranged in spaced apart, parallel relation to each other. A pair of cross beams 2, which are channel shaped in transverse section, extend across the tops of the base members 1, adjacent one end thereof, and are rigidly connected thereto adjacent their ends.

A table like structure, consisting of a table top 3 and two pairs of legs 4, has its legs 4 connected to the base members 1, adjacent the ends thereof opposite the cross beams 2, and extends upwardly therefrom.

An angle bar 5 is arranged in spaced apart, parallel relation to one of the base members 1, on the side thereof opposite the other base member 1, and is connected at its ends, by angle bars 6 and 7, to the legs 4 of one pair, above the adjacent base member 1.

A rotatable shaft 8 extends transversely of the base members 1, and is journaled at its ends in bearings carried by an upstanding bracket 9 attached to the angle bar 5 and a horizontally extending bracket 10 attached to one of the legs 4 on the opposite side of the frame, in spaced apart relation to the adjacent ends of the base members 1.

A sub-frame 11, which is positioned below the table top 3, is formed in part by a pair of substantially rectangular planar members 12 and 13. The planar members 12 and 13 are normally disposed horizontally, one above the other, and are connected in parallel, spaced apart relation to each other by an end plate 14, a top plate 15, and a pair of spacer elements 16.

A pair of brackets 17, which are connected to opposite sides of the end plate 14, have bearings therein which are journaled on the rotatable shaft 8, whereby the shaft 8 provides a pivotal support for one end of the sub frame 11.

A normally vertical disposed shaft 18 is rotatably supported adjacent its lower end in bearings provided therefor in the planar members 12 and 13 of the sub frame 11, and extends upwardly through a rectangular opening 19 in the table top 3. A rectangular block 20, which is shorter than the opening 19, is received in the opening 19, surrounding the shaft 18, and is movable reciprocally, in an arcuate path corresponding to the pivotal movement of the sub frame 11 about the axis of the shaft 8, and the movement of the shaft 18 therewith, relative to the opening 19.

The block 20 has a bearing 21 therein which is journaled on the shaft 18. The diameter of the shaft 18 is reduced to form an upwardly facing shoulder 22 for abutment against the under side of the bearing 21, to provide a rotatable support for the block 20.

A pair of mutually aligned bores 23 and 24, which are formed in the table top 3, communicate at their inner ends with opposite ends of the opening 19 and at their outer ends with opposite side edges of the table top 3. The bore 23 is threaded.

An adjusting screw 25, which is threaded in the bore 23 and has a lock nut 26 threaded thereon whereby it is adapted to be secured in its adjusted positions, extends into the opening 19 for abutting engagement with one end of the block 20.

A rod 27, which is inserted in the bore 24, has a horizontally disposed pin 28 extending transversely through an opening therefor in its inner end. The inner end of the rod 27, and the pin 28, are received in a T shaped slot 29 therefor in the adjacent end of the block 20, whereby the rod 27 is pivotally connected to the block 20.

The diameter of the rod 27 is reduced intermediate its ends to form an outwardly facing shoulder 30. The shoulder 30 provides a seat for a compression spring 31, which is received in the outer end of the bore 24, surrounding the rod 27.

A plate 32, which is attached to the adjacent edge of the table top 3, and closes the outer end of the bore 24, has an opening therein surrounding the rod 27.

A lever 33, which is pivotally connected at one end to lugs 34 attached to the plate 32, has an opening therein surrounding the rod 27, and is adapted to abut a nut 35 attached to the outer end of the rod 27, and having a lock nut 36 associated therewith, upon movement of the lever 33 about its pivot, whereby the rod 27 is movable longitudinally in the bore 24, against the resistance of the compression spring 31, and the block 20 is movable in the opening 19, to thereby tilt the shaft 18 with the sub-frame 11 about the axis of the shaft 8.

A latch 37, which is pivotally connected intermediate its ends to one of the legs 4 and is acted on by a tension spring 38 whereby it is biased in its latched position, is engageable with the lever 33 whereby the shaft 18 is adapted to be secured in its tilted position.

An electric motor 39 is mounted on the cross beams 2 intermediate their ends. A pulley wheel 40, which is connected to the shaft of the motor 39, is connected by belts 41 to a pulley wheel 42, which is connected to a shaft 43 intermediate its ends, whereby the shaft 43 is driven by the motor 39.

A fly wheel 44 is attached to one end of the shaft 43. A worm gear (not shown), which is enclosed in a housing 45 therefor, is connected to the shaft 43 intermediate its ends. A gear (not shown), which is enclosed in a housing 46 therefor, meshes with the worm gear. The last mentioned gear is connected to a shaft 47 intermediate its ends, whereby the shaft 47 is driven by the shaft 43.

The shaft 47 is journaled in bearings therefor in brackets 48 and 49, which are attached to the table top 3. The gear housings 45 and 46 are connected to each other, and the housing 46 is attached to the bracket 48.

A sprocket 50, which is connected to one end of the shaft 47, is connected by a chain belt 51 to a sprocket 52, which is connected to one end of the shaft 8, whereby the shaft 8 is driven by the shaft 47. A worm gear 53, which is connected to the shaft 8 intermediate its ends, meshes with a gear 54, which is connected to the shaft 18, whereby the shaft 18 is driven by the shaft 8.

An angularly bent strap 55, which is connected at one end to the under side of the block 20, has a notch in its opposite end which is engageable with a switch lever 56, which controls the operation of the motor 39, whereby the motor 39 is stopped automatically, and started again, upon movement of the block 20 in the opening 19 in response to the action of the lever 33.

A cutting wheel 57, which is connected to the end of the shaft 47 opposite the sprocket 50, has a plurality of punch elements 58 extending radially outwardly from its peripheral surface. The punch elements 58 are spaced circumferentially apart from each other, and are wedge shaped in radial section.

The punch elements 58 coact with a pair of dies 59, which are mounted on the table top 3, on opposite sides of the cutting wheel 57, to cut the teeth of a circular saw blade 60, shown in dotted lines. The saw blade 60 is removably connected to the upper end of the shaft 18, above the dies 59 and with its peripheral edge in the path of the cutting wheel 57. The saw blade 60 is movable in and out of engagement with the cutting wheel 57 upon tilting the shaft 18, by manipulation of the lever 33.

An element 61, which is positioned immediately above the table top 3, surrounds the shaft 18 and is keyed thereto. The element 61 has a cylindrical upper portion 62 and a rectangular lower portion 63.

An element 64, which is positioned above the element 61, surrounding the shaft 18, has a cup shaped upper portion 65 which encloses the extreme upper end of the shaft 18, a cylindrical intermediate portion 66 which surrounds the cylindrical upper portion 62 of the element 61, and a rectangular lower portion 67 having a rectangular groove 68 in its under side whereby it straddles the rectangular lower portion 63 of the element 61. The cup shaped upper portion 65 has bearings 69 therein whereby it is journaled on the upper end of the shaft 18.

The element 64 is capable of limited rotative movement relative to the element 61 and the shaft 18. A pair of compression springs 70, which are received in recesses 71 therefor in opposite sides of the rectangular lower portion 63 of the element 61, adjacent opposite ends thereof, act on the adjacent sides of the rectangular groove 68 whereby torque is applied to the element 64 upon rotation of the shaft 18. The arrangement is such that the saw blade 60, which is movable with the element 64, is rotated intermittently, and abruptly, as its peripheral edge is alternately engaged and disengaged by the punch elements 58 of the cutting wheel 57.

An annular saw blade supporting plate 72, which surrounds the intermediate portion 66 of the element 64 and is spaced radially outwardly therefrom, is supported on the ends of the rectangular lower portion 67, to which it is connected. The intermediate portion 66 has an upwardly facing, beveled external shoulder 73 thereon opposite the saw blade supporting plate 72.

A cup shaped element 74, which is received on the element 64 and extends downwardly to a point opposite the shoulder 73, has a central opening in its upper end loosely surrounding a stud 75, which extends upwardly from the element 64. A nut 76, which has a handle 77 thereon, is threaded on the stud 75 whereby the cup shaped element 74 is adjustable vertically relative to the element 64.

The cup shaped element 74 has circumferentially spaced longitudinal slot 78 therein, beginning at its lower end, whereby it is divided into segments 79. The segments 79 each have a beveled surface 80 adjacent its lower end which is operable as a cam, for engagement with the shoulder 73 of the element 64, whereby the segments 79 are spread apart, for frictional engagement with the inner periphery of the saw blade 60, upon tightening the nut 76.

The segments 79 have circumferentially spaced lugs 81 extending radially outwardly from their peripheral surfaces, adjacent their lower ends. The lugs 81 are selectively engageable by lugs 82, which extend radially inwardly from the inner periphery of the saw blade 60, whereby the saw blade 60 is positively rotated with the element 64.

A pin 83, which is positioned eccentrically of the element 64, and extends upwardly therefrom, parallel to the stud 75, is passed through an opening therefor in the cup shaped element 74, whereby rotative movement of the cup shaped element 74 relative to the element 64 is prevented.

A receptacle 84, which is open at the top and is adapted to contain a suitable lubricant, is positioned below the cutting wheel 57 and is supported on brackets 85 attached to two of the legs 4. A wheel 86, which has right angularly bent fingers 87, each corresponding to one of the punch elements 58, extending radially outwardly from its peripheral surface, is rotatably mounted on a bracket 88 depending from the bracket 49, whereby it is partially submerged in lubricant contained in the receptacle 84. The fingers 87 are engageable with the punch elements 58, whereby the wheel 86 is rotated with the cutting wheel 57 and lubricant is applied to the punch elements 58. A friction ring 89 is arranged on the pivot 90 of the wheel 86 whereby to resist its free rotation in order that metal cuttings or slugs can be removed from the punch elements 58 in addition to lubricating the same.

The invention herein, although described in great detail, is capable of certain changes and modifications by persons skilled in the art without departing from the spirit and intent thereof or the scope of the appended claims.

What is claimed is:

1. In an automatic machine for cutting the teeth of circular saw blades, having a frame and a horizontal working surface on said frame, means for rotatably supporting a saw blade above the working surface whereby the saw blade is rotatable intermittently in a horizontal plane, a cutting wheel mounted on the frame and rotatable in a vertical plane tangential to the axis of said saw blade, the cutting wheel having a plurality of punch elements spaced radially thereof and wedge shaped in radial section, a pair of dies adjustably mounted on the said working surface and below the saw blade, the said dies defining a V-shaped register with said punch elements to cut the teeth of the saw blade, and drive means acting on the saw blade supporting means and the cutting wheel whereby the cutting wheel is adapted to be rotated continuously and the saw blade is adapted to be rotated intermittently, and abruptly, as it is alternately engaged and disengaged by the punch elements.

2. In an automatic machine for cutting saw teeth, having a frame and a horizontal working surface on said frame, means in said frame and extending vertically above said working surface for supporting a saw blade for intermittent rotation in a horizontal plane, a saw blade on said supporting means, a pair of angularly disposed dies on said working surface beneath and near the periphery of said saw blade, the said dies together forming a wedge-shaped vertical recess, a rotary cutting wheel mounted for continuous rotation in a vertical plane tangential to the axis of said saw blade, a plurality of radially spaced cutting elements formed on said cutting wheel, each being wedge-shaped in radial section and adapted to pass through said saw blade in registry with said wedge-shaped recess formed by said dies, and drive means for continuously rotating said cutting wheel and whereby said saw blade is intermittently and abruptly rotated as the latter is alternately engaged and disengaged by said cutting elements.

3. The structure of claim 1, the drive means including a normally vertically disposed driven shaft having the saw blade supporting means journaled on its upper end, mutually engaging means connected to the shaft and the saw blade supporting means, respectively, whereby the saw blade supporting means is capable of a limited rotative movement relative to the shaft, and spring means acting on the mutually engaging means whereby torque is applied to the saw blade supporting means upon rotation of the shaft.

4. The structure of claim 3, the drive means further including a second driven shaft operatively connected to the first mentioned shaft whereby the first shaft is adapted to be driven by the second shaft, the second shaft being disposed horizontally, adjacent the lower end of the first shaft, and a sub frame pivotally connected to the second shaft, the first shaft being rotatably supported on the sub frame whereby it is adapted to be moved pivotally with the sub frame, about the axis of the second shaft, sufficiently to disengage the saw blade from the cutting wheel.

5. The structure of claim 4, and means for lubricating the punch elements comprising a receptacle positioned below the cutting wheel and adapted to contain a suitable lubricant, and a wheel rotatable in and out of the lubricant and having means engageable with the punch elements whereby lubricant is applied thereto.

References Cited in the file of this patent

UNITED STATES PATENTS

| | | |
|---|---|---|
| 1,717 | Carver | Aug. 12, 1840 |
| 28,508 | Schutte | May 29, 1860 |
| 133,190 | Bevan | Nov. 19, 1872 |
| 888,704 | Gebhart | May 26, 1908 |

FOREIGN PATENTS

| | | |
|---|---|---|
| 1,742 | Great Britain | July 25, 1853 |